United States Patent [19]

Needham

[11] Patent Number: 5,776,582
[45] Date of Patent: Jul. 7, 1998

[54] LOAD-BEARING STRUCTURES WITH INTERLOCKABLE EDGES

[75] Inventor: Donald G. Needham, Ramona, Okla.

[73] Assignee: Polyplus, Inc., Bartlesville, Okla.

[21] Appl. No.: 689,195

[22] Filed: Aug. 5, 1996

[51] Int. Cl.[6] ............................................. B32B 3/12
[52] U.S. Cl. ..................... 428/116; 428/117; 428/902
[58] Field of Search .................... 428/116, 117, 428/902

[56]  References Cited

U.S. PATENT DOCUMENTS

| | | | |
|---|---|---|---|
| 2,481,046 | 9/1949 | Scurlock | 428/116 X |
| 3,617,416 | 11/1971 | Kromrey | 428/118 X |
| 3,689,345 | 9/1972 | Figge et al. | 428/116 X |
| 3,865,679 | 2/1975 | Hale | 428/116 X |
| 3,998,023 | 12/1976 | Anderson | 428/117 X |
| 4,462,712 | 7/1984 | Penland, Sr. | 52/581 X |
| 4,540,737 | 9/1985 | Wissbrun et al. | 428/1 X |
| 4,954,382 | 9/1990 | Riefler et al. | 428/116 |
| 5,139,596 | 8/1992 | Fell | 428/116 X |
| 5,234,204 | 8/1993 | Hunt | 269/41 |
| 5,242,735 | 9/1993 | Blankenburg et al. | 428/116 |
| 5,405,567 | 4/1995 | Needham et al. | 428/903.3 X |
| 5,607,531 | 3/1997 | Needham et al. | 428/1 X |

*Primary Examiner*—Henry F. Epstein
*Attorney, Agent, or Firm*—Timothy R. Kroboth

[57] ABSTRACT

The present invention provides a load-bearing structure having interlockable peripheral edges. The peripheral edges provide at least one pair of upper and lower offsets. Each offset includes a plurality of spaced apart projections.

15 Claims, 5 Drawing Sheets

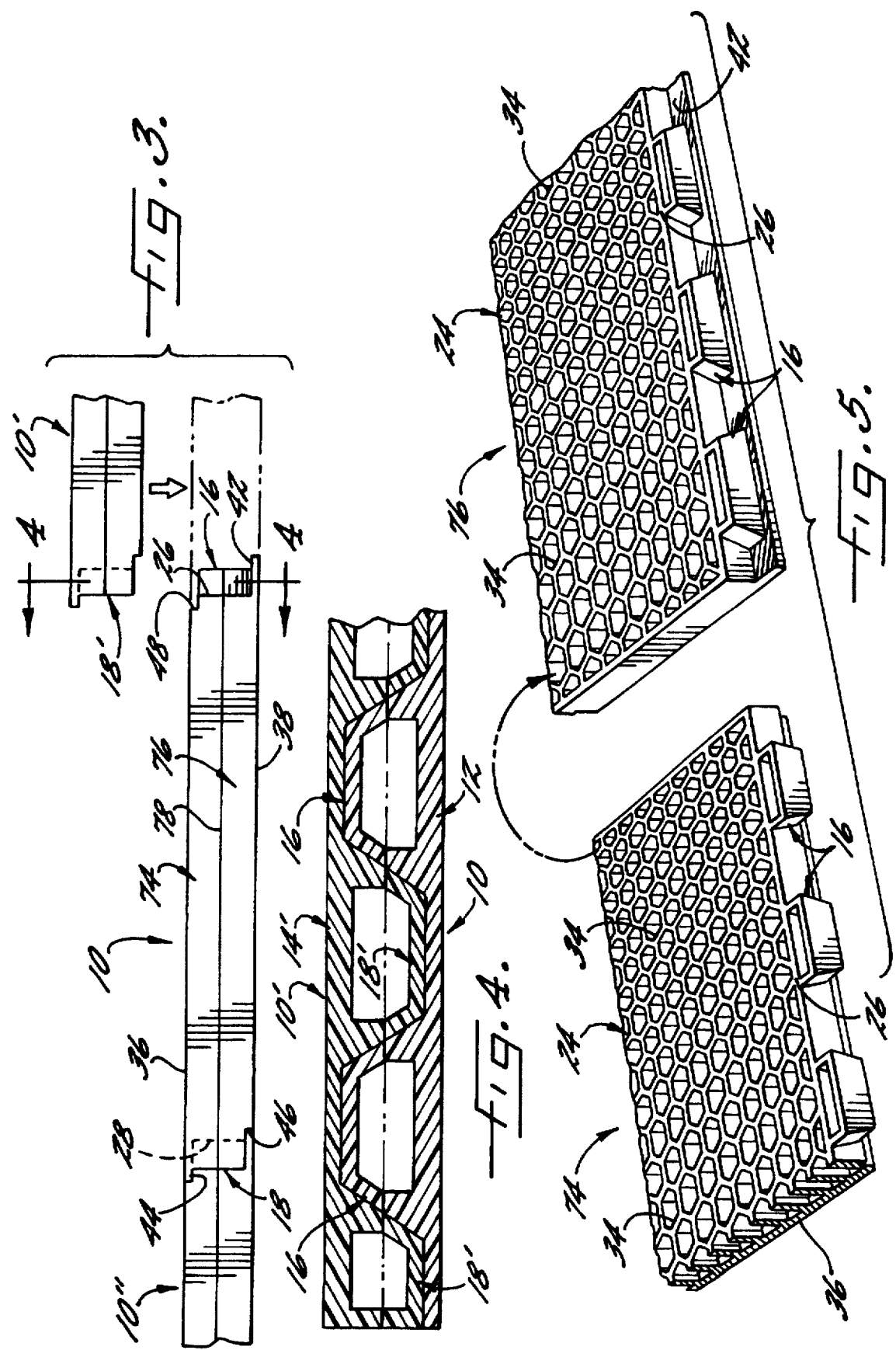

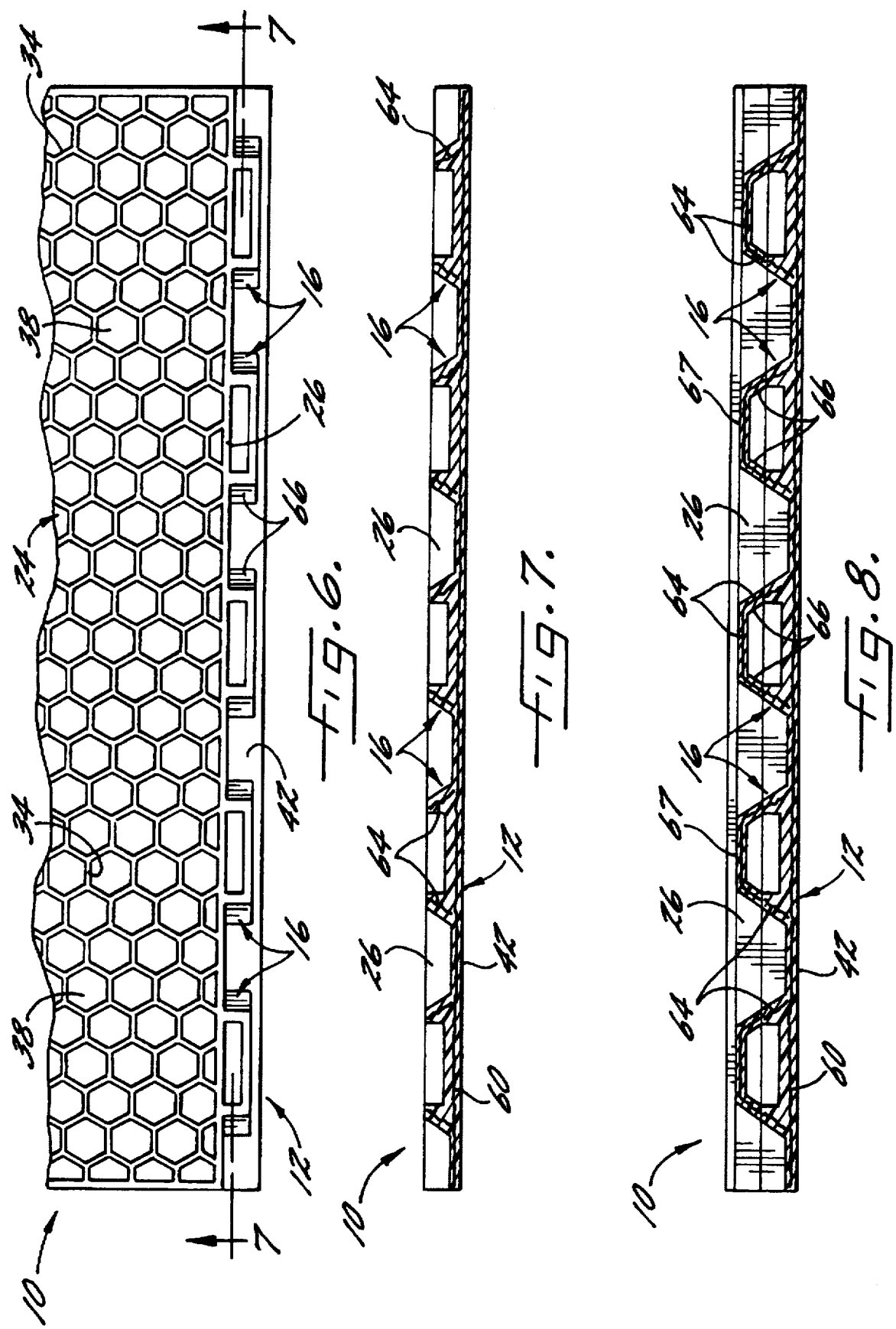

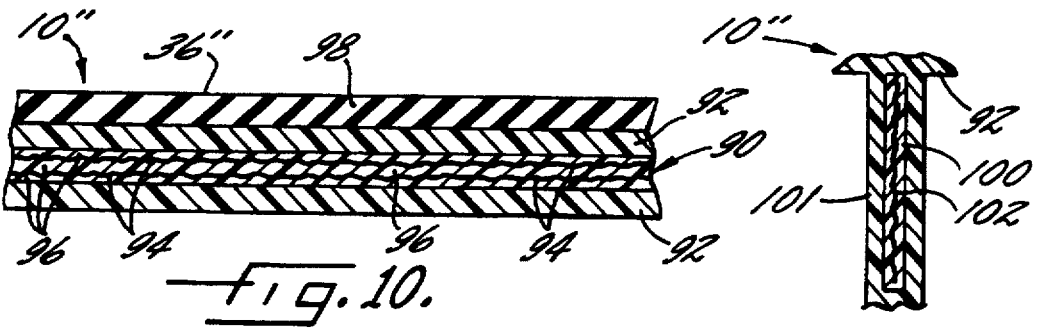
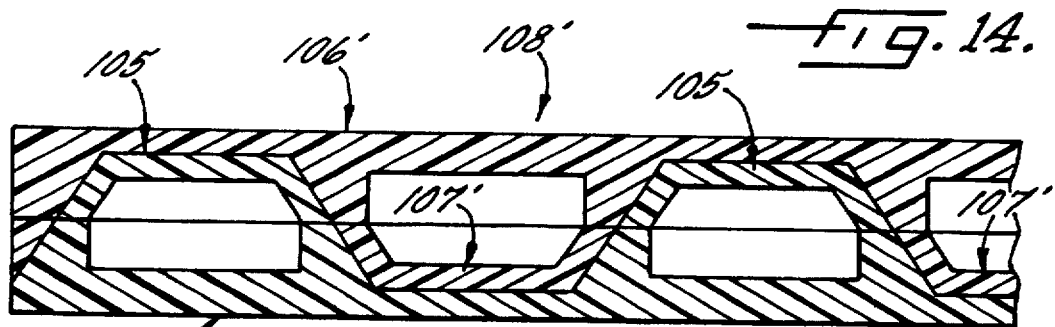
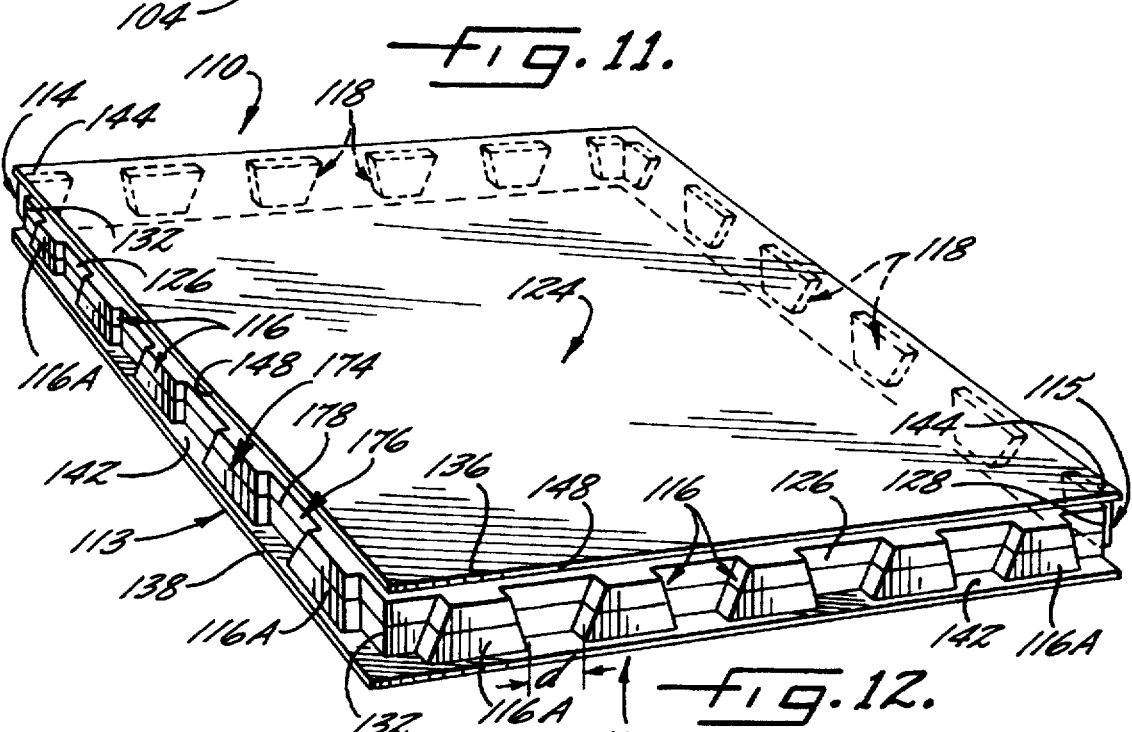
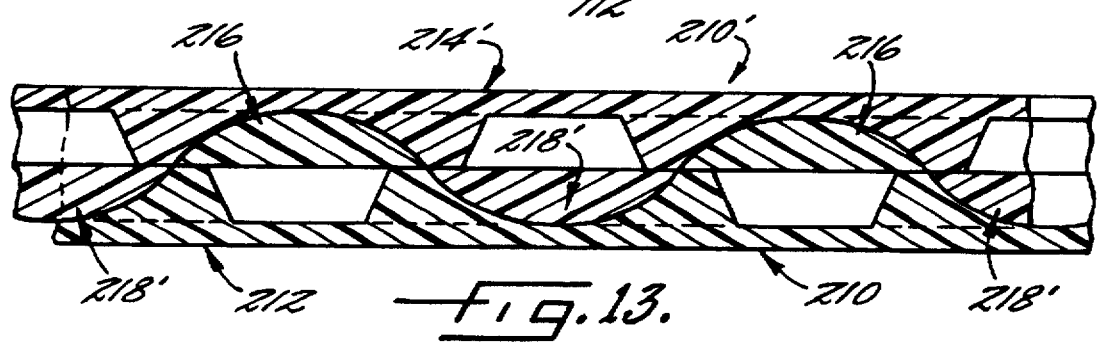

5,776,582

LOAD-BEARING STRUCTURES WITH INTERLOCKABLE EDGES

TECHNICAL FIELD

This invention relates to load-bearing structures having interlockable peripheral edges, and to the use of reinforcing fiber/polymer composites in load-bearing structures.

BACKGROUND ART

Thermoplastic polymer/reinforcing fiber composites are used to replace metals in aerospace and automotive applications. However, new applications have been slow due to the higher cost of composites when compared to conventional materials like metal, wood or concrete. If the cost could be adequately reduced and yet the strength could be maintained, numerous applications exist where thermoplastic polymer/reinforcing fiber composites could replace metal, wood or concrete.

Known uses of thermoplastic polymer/reinforcing fiber composites include reinforcing bars or re-bars, reinforced mats and reinforced fabrics. Advantageously, the thermoplastic polymer strengthens and stiffens the composite. This type of polymer is often termed a "matrix resin" in the context of polymer/reinforcing fiber composites. Engineering type, plastic resins such as polyester, nylon, polyphenylene sulfide and polyurethane are frequently used as matrix resins in fiberglass composite laminates and pultrusion profiles. When solid, these resins are very rigid and provide the most stiffness, but fracture when overstressed, often leaving sharp splintered edges.

Load-bearing structures with overlapping edges which are fitted together or otherwise combined to make a load-bearing surface, are well known. Illustrative are hard wood flooring pieces provided with tongue and groove interfit. Nevertheless, there is a need for a load-bearing structure having an improved interlocking edge, and in particular with reduced weight but yet good load-bearing properties.

SUMMARY OF THE INVENTION

In accordance with the present invention, an improved load-bearing structure with an overlapping edge to be fitted together with like parts to make a load-bearing surface, is provided. Beneficially, the structure includes an edge which interlocks with an edge of a like part to prevent slippage or movement in a direction parallel to the interlocked joint.

Advantageously, the load-bearing structure includes peripheral edges providing at least one pair of upper and lower offsets, and the upper offset includes a plurality of spaced apart, depending projections, and the lower offset includes a plurality of complementary upstanding projections adapted to interlock with an upper offset of a second load-bearing structure.

The load-bearing structure is advantageously provided with cellular structure for weight and cost reduction, and for strength, the cellular structure is preferably a honeycomb structure. The structure may conveniently be made by welding or otherwise fusing together two half sections each with cellular structure on a solid (that is, non-cellular) surface, to dispose the cellular structure between upper and lower solid surfaces. Reinforcing fiber/matrix resin composites may be advantageously located in the load-bearing structure.

In the drawing and in the detailed description of the invention that follows, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWINGS

Reference is now made to the accompanying drawing, which forms a part of the specification of the present invention, and which depicts preferred embodiments in accordance with the present invention.

FIG. 3 is a side view of two load-bearing structures in accordance with FIG. 1 in interlocked relationship, with a third load-bearing structure in accordance with FIG. 1 positioned for interlocking;

FIG. 4 is a simplified cross-sectional view of an interlocked joint, taken substantially along line 4—4 of FIG. 3;

FIG. 5 is a perspective view of structural members which may be combined to form the load-bearing structure of FIG. 1;

FIG. 6 is a top view taken substantially along line 6—6 of FIG. 1, and corresponds to a top view of a structural member of FIG. 5;

FIG. 7 is a cross-sectional view taken substantially along line 7—7 of FIG. 6, showing fiber-reinforcement of a peripheral edge/lower offset;

FIG. 8 is a cross-sectional view similar to FIG. 7, taken substantially perpendicular to the upstanding projections of FIG. 1;

FIG. 10 is an enlarged, cross-sectional, partial view of a modified upper skin structure of a load-bearing structure in accordance with the present invention;

FIG. 11 is a cross-sectional view similar to FIG. 4 of a modified interlocked joint in accordance with the present invention;

FIG. 12 is a plan view of another embodiment of a load-bearing structure in accordance with the present invention;

FIG. 13 is a cross-sectional view similar to FIG. 4 of an interlocked joint, showing a modification of a useful shape for the interlocking projections; and FIG. 14 is an enlarged, cross-sectional, partial view taken vertically through a wall of a honeycomb cell.

DETAILED DESCRIPTION

As mentioned, the present invention relates to improved load-bearing structures with overlapping edges to be fitted together to make a load-bearing surface such as flooring, driveways and decking, or a temporary surface. Referring to FIGS. 1 to 9, a preferred load-bearing structure 10 in accordance with the present invention, is provided.

Figure 1:
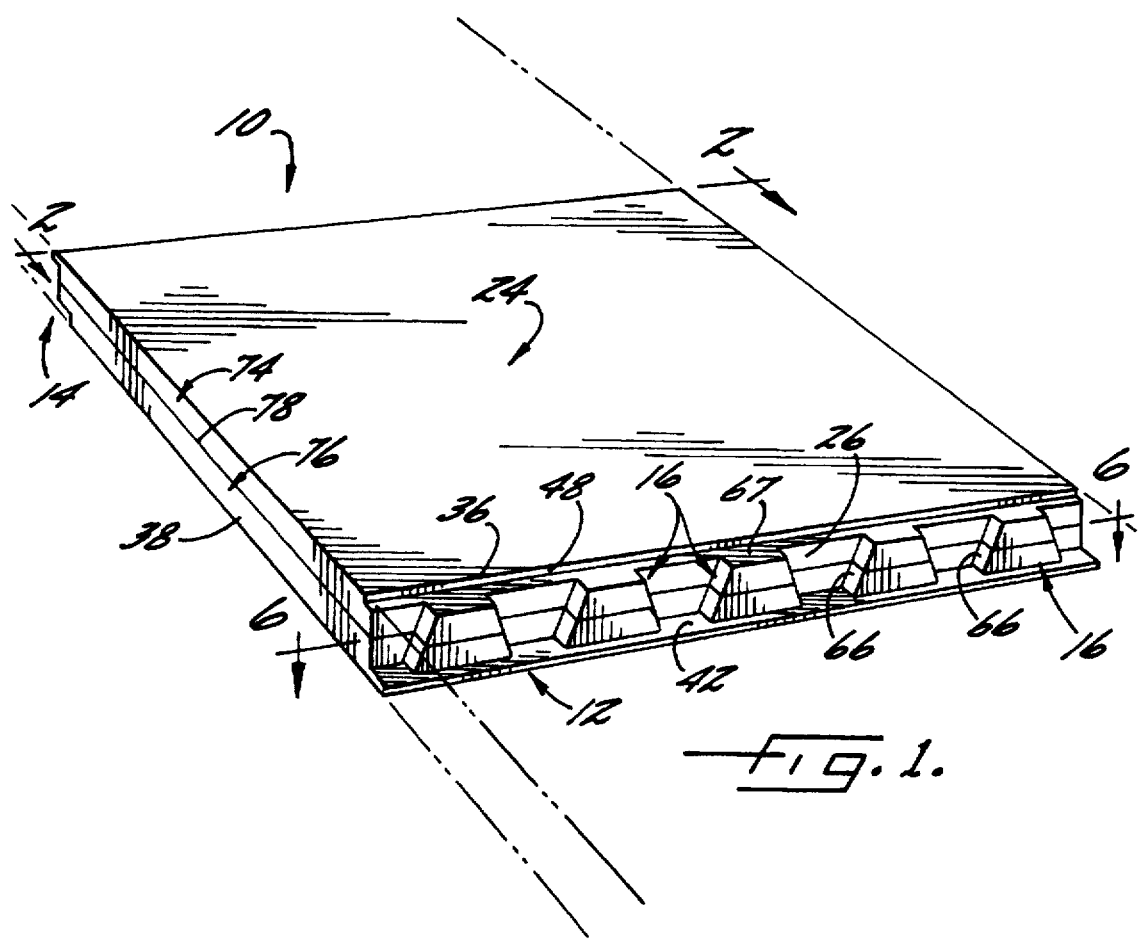
FIG. 1 is a perspective view of a preferred load-bearing structure in accordance with the present invention.
Figure 2:
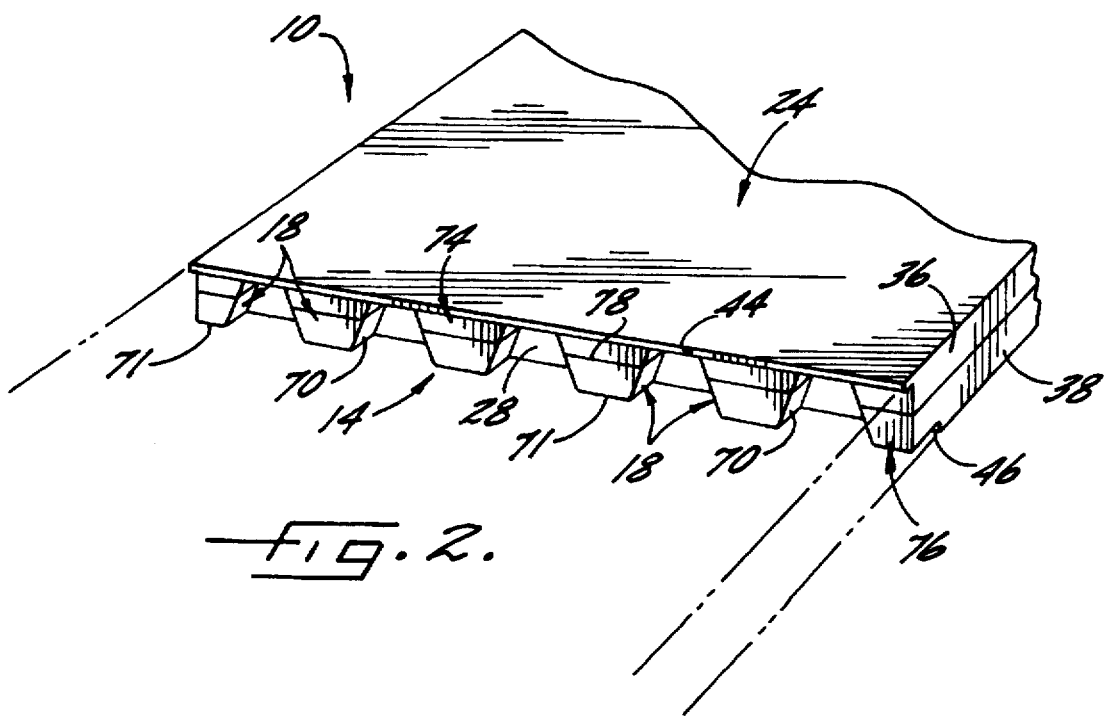
FIG. 2 is a perspective view of an opposite end of the load-bearing structure of FIG. 1, taken substantially along line 2—2 of FIG. 1.

With particular reference to FIGS. 1 and 2, load-bearing structure 10 includes peripheral edges 12 and 14 respectively providing a lower offset and an upper offset. Peripheral edge/lower offset 12 includes a plurality of upstanding projections 16 spaced apart from one another, and peripheral edge/upper offset 14 includes a plurality of depending projections 18 complementary to the upstanding projections.

Spaced apart projections 16 and spaced apart projections 18 provide for interlocking with adjacent, like configured structural members situated to mate with peripheral edges 12 and 14. More particularly, as illustrated in FIGS. 3 and 4, spaced apart, upstanding projections 16 are interlockable with complementary depending, spaced apart projections 18' of a peripheral edge of a second load-bearing structure 10', and spaced apart, depending projections 18 are interlocked with complementary upstanding, spaced apart projections of a third load-bearing structure 10". With particular reference to FIG. 4, each of upstanding projections 16 has a complementary shape and dimensions for mating contact and interlock with upper offset 14' of load-bearing structure 10'.

Referring particularly to FIGS. 1 and 2, as well as FIGS. 5 and 6, load bearing structure 10 includes a body portion 24 having a side wall 26 beneficially integral with upstanding projections 16, and an opposite side wall 28 likewise beneficially integral with depending projections 18. In this way, side walls 26,28 advantageously provides support for projections 16,18, although, if desired, the projections could be spaced apart from the respective side walls.

Projections 16,18 conveniently are provided with a truncated, polygonal-based, pyramidal shape. However, other shapes that provide for interlocking, may be chosen, as illustrated by the sinusoidal shape of upstanding projections 216 and depending projections 218' of interlocked peripheral edges 212 and 214' of load-bearing structures 210,210' of FIG. 13. For convenience, reference numerals corresponding to those used in describing FIGS. 1 to 9, are used to indicate like features of FIG. 13.

It is not necessary that a load-bearing structure in accordance with the present invention, be rectangular or square or be limited to four sides. For example, the structure could have six or more sides such as a hexagon or an octagon. If desired, a load-bearing structure in accordance with the present invention, could have varying combinations of upper offsets and lower offsets, such as more than one pair of upper and lower offsets, depending upon considerations including the particular type and dimensions of a load-bearing surface to be constructed by the interlocking, and the size of the individual interlocking structures. As shown, load-bearing structure 10 has opposing upper and lower offsets; however, for certain applications, upper and lower offsets may not need to be opposite to one another.

With particular reference to FIGS. 4 to 9, load-bearing structure 10 beneficially is provided with cellular structure for weight and cost reduction, including cellular structure in projections 16,18. To this end, body portion 24 advantageously includes cellular structure 34 disposed between upper and lower skin structures 36,38 (best seen in FIGS. 5 and 6) integral with and covering the cellular structure. Preferably, the cellular structure of body portion 24 is a honeycomb structure.

Relative dimensions of projections 16,18 and the cells of cellular structure 34 may, of course, be varied as desired or appropriate. For instance, a peripheral edge could be provided with a greater number of interlockable projections than depicted, and in such case, the interlockable projections could be closer in size to the cells than is depicted in FIGS. 5 and 6. Likewise, the relative height of the interlockable projections to the thickness of skin structures 36,38 may be varied as desired or appropriate. For instance, the skin could be thicker than shown.

Referring again to FIGS. 1 to 3, an edge portion 42 of lower offset 12 is an extension of the lower skin structure 38 and beneficially extends beyond upstanding projections 16, and an edge portion 44 of upper offset 14 is an extension of upper skin structure 36 and beneficially extends beyond depending projections 18. Complementary thereto, an edge 46 of lower skin structure 38 is stepped back from side wall 28, and an edge 48 of upper skin structure 36 is stepped back from side wall 26. In this manner, an interlocked joint is sealed.

Figure 9A:
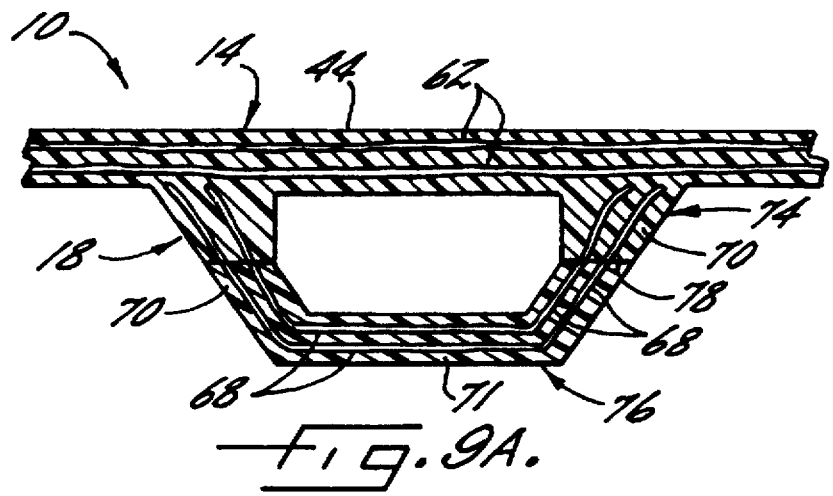
FIG. 9A is an enlarged, more detailed, cross-sectional view similar to FIG. 8, taken substantially perpendicular to the depending projections of FIG. 2, showing fiber reinforcement of a portion of a peripheral edge/upper offset.

With further reference to FIGS. 7 and 8, for strength of peripheral edge 12, the lower skin structure advantageously includes a reinforcing fiber/matrix resin composite 60 that extends into edge portion 42, and hollow projections 16 each include a reinforcing fiber/matrix resin composite 64 disposed in a generally U-shaped configuration within cell-forming walls 66,67 thereof, which have a generally U-shaped cross-section. With reference to FIG. 9A, likewise for strength of peripheral edge 14, the upper skin structure includes a reinforcing fiber/matrix resin composite 62 that extends into edge portion 44, and hollow projections 18 each include a reinforcing fiber/matrix resin composite 68 disposed in a generally U-shaped configuration within cell-forming walls 70,71 thereof, which also form a generally U-shaped cross-section.

It may be understood that reinforcing fiber/matrix resin composites 60,64 of FIGS. 7 and 8 advantageously correspond to the more detailed depiction of FIG. 9A, that is, a pair of spaced apart, fibrous structures for increased structural strength. If desired, additional spaced apart, fibrous structures may be included. As shown, these composites are advantageously disposed within, rather than on the surface of, a load-bearing structure.

The reinforcing fiber of useful composites is beneficially a fibrous structure such as a woven web, disposed or encapsulated within a matrix resin. Useful fibrous web structures are advantageously open so as to permit matrix resin flow through the web, and include nonwoven and needle-punched webs. If desired, the reinforcing fiber may be pre-coated with molten matrix resin using filament coating technology. Especially useful filament coating technology is described in U.S. patent application Ser. No. 08/475,319, filed on Jun. 5, 1995, now U.S. Pat. No. 5,607,531, issued on Mar. 4, 1997, the pertinent disclosure of which is hereby incorporated herein by reference. It is desirable that filaments are coated with matrix resin and the individually coated filaments disposed or encapsulated within the matrix resin.

Useful reinforcing fiber is preferably high strength, structural fiber. Exemplary high strength, structural fiber includes glass fiber such as E glass and S glass, carbon fiber, aramid fiber, polyphenylene sulfide fiber, and liquid crystalline polymer fiber. Mixtures of fiber may be used.

Exemplary suitable thermoplastic polymers for use as the matrix resin include polyolefins such as polyethylene and polypropylene, polyesters such as polyethylene terephthalate, polymers of chlorinated ethylene monomers such as vinyl chloride, polyphenylene sulfide, and liquid crystalline polymers, in particular melt-processable liquid crystalline polymers. However, in load-bearing applications where some flexibility is desired and fracturing and sharp edges are not acceptable, polyolefins such as polyethylene and polypropylene advantageously are beneficially used as the matrix resin, whereas polyesters and polyphenylene sulfide would be avoided. Illustrative reinforcing fiber/ matrix resin composites useful in the present invention, include fiberglass/polyethylene and fiberglass/ polypropylene.

Referring again to FIG. 5, load-bearing structure 10 is advantageously assembled from molded structural members 74,76, as indicated. The structure is conveniently made by welding or otherwise fusing together two half sections each with cellular structure on a solid (that is, non-cellular) surface, to dispose the cellular structure between upper and lower solid surfaces. Thus, load-bearing structure 10 consists of two partial structures 74,76 combined at a joining line 78, conveniently by fusion welding. The welding typically leaves a visible bead. By combining edge portions from both of structural members 74,76, an offset or edge strengthened by both structural members is provided. Further edge strengthening could be achieved using a peripheral edge having a solid cross-section, that is, no cellular structure.

Figure 9B:
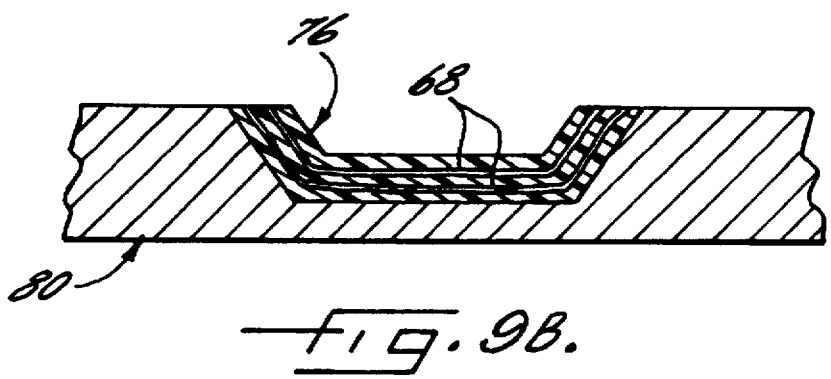
FIG. 9B is a cross-sectional view depicting the generally U-shaped, lower part of the depending projection of FIG. 9A, as formed by molding.
Figure 9C:
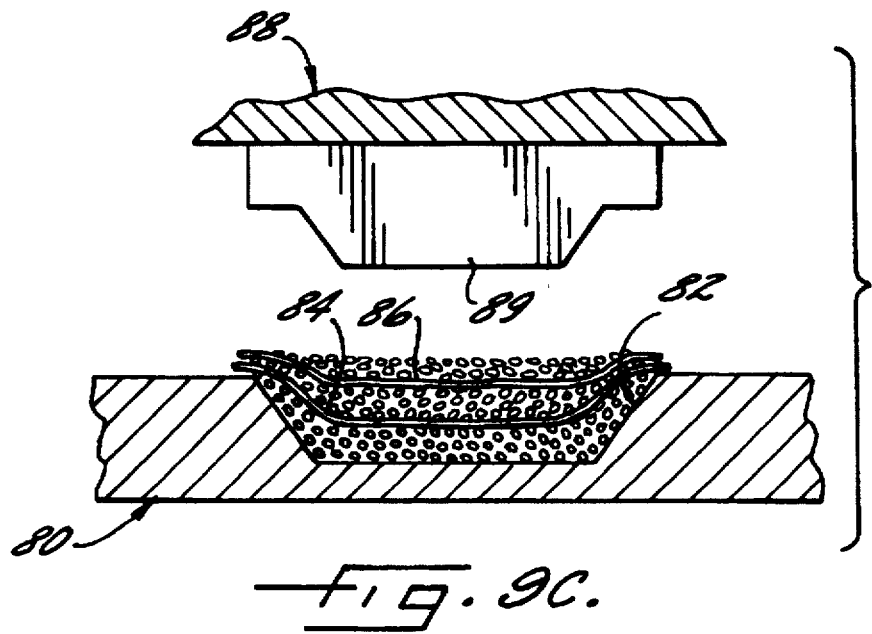
FIG. 9C depicts in cross-sectional view, a method of molding the generally U-shaped, lower part shown in FIG. 9B.

Referring now to FIGS. 9A to 9C, as indicated, depending projection 18 includes upper part 74 and lower part 76 combined at joining line 78. Lower part 76 is advantageously formed by molding as now described. First, a layer of a suitable thermoplastic material is placed in an appropriately configured, lower mold member 80 to a suitable depth. The mold member has a generally U-shaped contour 82. Next, a reinforcing fiber layer 84 is added. Then, a second layer of a suitable thermoplastic material is added. Afterwards, a second reinforcing fiber layer 86 is added. Thereafter, a third layer of a suitable thermoplastic material is added. The thermoplastic materials may be the same as or different than one another.

As illustrated, the thermoplastic materials are conveniently added in solid form as pellets, powder, granules and so forth, to the molding member to provide layers of an appropriate depth determined by the desired thickness of the corresponding resultant layer. Alternatively, the thermoplastic material may be added in the form of a film. Use of film between reinforcing fiber layers beneficially prevents blocking; otherwise, after consolidation, it may be possible to pull the fibrous layers apart from one another. To prevent delamination, either or both the reinforcing fiber and thermoplastic material may advantageously be pre-treated with a suitable complexing or bonding agent for promoting the formation of a unitary structure resistant to delamination. The thermoplastic materials, if different from one another, are advantageously compatible with one another.

After the layering illustrated in FIG. 9C has been completed, an upper mold member 88 having an appropriately configured plug extension 89 for mating with contour 82 of lower mold member 80 is combined with the lower mold member; and the upper and lower mold members are subjected to suitable heat and pressure. After cooling, lower molded part 76 is separated from the lower and upper mold members.

Referring to FIG. 10, details of a modified upper skin structure 36" of load-bearing structure 10" are shown. Upper skin structure 36" beneficially includes a layer 90 of reinforcing fiber/matrix resin composite disposed between and thermally bonded to thermoplastic polymer layers 92, forming a unitary multilayer structure. The composite layer advantageously includes reinforcing fiber in the form of a pair of fibrous web structures 94 disposed or encapsulated within a matrix resin 96. The layer-to-layer bonding is provided for by the reinforcing fiber being thoroughly coated with, and encapsulated or disposed within, the matrix resin. For traction, beneficially disposed exterior to and bonded to underlying thermoplastic layer 92 is a traction-enhancing layer 98 made of, for example rubber. Similarly, an exterior layer having other properties may be provided for another purpose. As indicated, this modified skin structure may extend into the peripheral edge.

As indicated in FIG. 14, the inner layer of a multilayer skin is beneficially integral with the cell-forming walls, and therefore the inner layer and walls will be made from the same thermoplastic material. Also beneficial are a plurality of reinforcing composite structures disposed within cell-forming walls. With continued reference to FIG. 14, reinforcing fiber/matrix resin composite 100 advantageously stiffens cell-forming, vertical wall 1C1. Thermal bonding of the composite to the adjacent structure is provided for by reinforcing fiber 102 being thoroughly coated with, and encapsulated or disposed within, the matrix resin.

As indicated, reinforcing fiber/matrix resin composites are beneficially thermally bonded or fused to adjacent thermoplastic structure. It has been found that the compression strength, stiffness and stress rupture of large relatively flat plastic articles are benefitted by molding reinforcing fiber/ matrix resin composites into an article during manufacture, and using a matrix resin compatible with the molding resin so as to result in thermally bonding or fusing together into a solid mass. When some flexibility is desired and fracturing and sharp edges are not acceptable, polyolefins such as polyethylene and polypropylene, may be advantageously used as the matrix resin.

FIG. 11 shows an interlocked joint resulting from combining a modified lower offset 104 having upstanding projections 105, with a modified upper offset 106' having depending projections 107' of another load-bearing structure 108' in accordance with the present invention.

With reference to FIG. 12, a load-bearing structure 110 is shown which differs from structure 10 in having opposing lower and upper offsets 113,115, in addition to opposing lower and upper offsets 112,114. For sake of brevity, like features of FIG. 12 are not described, but rather are indicated by reference numerals corresponding to those of FIG. 1. Moreover, lower and upper offsets 113,115 conveniently correspond to lower and upper offsets 112,114, and thus corresponding features of lower and upper offsets 113,115 are indicated by reference numerals corresponding to those used for lower and upper offsets 112,114.

Conveniently, upstanding projections 116A are spaced from corners 132 a distance equal to about one-half a distance "d" between bases of the upstanding projections. A load-bearing surface may be constructed in which load-bearing structures 110 are arranged in a staggered or offset relationship.

A load-bearing structure in accordance with the present invention, may be formed of a variety of well known materials including thermoplastic resins. Use of a cellular structure and reinforcing fiber/matrix resin composites results in stiffness with less part weight, shorter cooling cycle during molding, and less problem with stress cracking, than if the structure were a solid structure, that is, without cellular structure.

In the preceding description of the present invention, there are shown and essentially described only preferred embodiments of this invention, but as mentioned, it is to be understood that the invention is capable of changes or modifications within the scope of the inventive concept expressed herein. Several changes or modifications have been mentioned for purposes of illustration.

I claim:

1. A load-bearing structure comprising a body portion comprising first and second skin structures respectively comprising a first peripheral edge portion and a second peripheral edge portion, and peripheral edges providing at least one pair of upper and lower offsets, wherein an upper offset of said at least one pair of upper and lower offsets, comprises said first peripheral edge portion and a plurality of spaced apart, depending projections uncovered by said second skin structure, and wherein a lower offset of said at least one pair of upper and lower offsets, comprises said second peripheral edge portion and a plurality of complementary upstanding projections uncovered by said first skin structure and adapted to interlock with an upper offset of a second load-bearing structure.

2. The load-bearing structure of claim 1, wherein said first peripheral edge portion extends beyond at least one of said plurality of depending projections.

3. The load-bearing structure of claim 1, wherein said second skin structure further an edge stepped back from at least one of said plurality of depending projections.

4. The load-bearing structure of claim 1, wherein each of said plurality of upstanding projections has a complementary shape and dimensions for mating contact and interlock with said upper offset of said second load-bearing structure.

5. The load-bearing structure of claim 1, wherein at least one projection selected from said plurality of upstanding projections and said plurality of depending projections, is hollow.

6. The load-bearing structure of claim 1, wherein at least one projection selected from said plurality of depending projections and said plurality of upstanding projections, has a truncated, polygonal-based, pyramidal shape.

7. The load-bearing structure of claim 1, wherein said body portion further comprises a side wall integral with at least one projection selected from said plurality of depending projections and said plurality of upstanding projections.

8. The load-bearing structure of claim 1, wherein said body portion comprises cellular structure disposed between said first and second skin structures, which are integral with and cover said cellular structure.

9. The load-bearing structure of claim 8, wherein said cellular structure comprises honeycomb structure.

10. The load-bearing structure of claim 8, wherein said load-bearing structure comprises two half sections of cellular structure fused together at a joining line, wherein at least one of said plurality of depending projections extends downwardly beyond said joining line.

11. The load-bearing structure of claim 1, further comprising a reinforcing fiber/matrix resin composite disposed in a location selected from at least one of said plurality of depending projections and at least one of said plurality of upstanding projections.

12. The load-bearing structure of claim 11, wherein said location is said at least one of said plurality of depending projections, which is hollow and has cell-forming walls having a generally U-shaped cross-section, and said composite is disposed in a generally U-shaped configuration within said cell-forming walls.

13. The load-bearing structure of claim 11, wherein said reinforcing fiber is a fibrous web structure.

14. A load-bearing structure comprising a body portion comprising first and second skin structures respectively comprising a first peripheral edge portion and a second peripheral edge portion, peripheral edges providing at least one pair of opposing upper and lower offsets, wherein an upper offset of said at least one pair of opposing upper and lower offsets, comprises said first peripheral edge portion and a plurality of spaced apart, depending projections uncovered by said second skin structure, and wherein a lower offset of said at least one pair of opposing upper and lower offsets, comprises said second peripheral edge portion and a plurality of complementary upstanding projections uncovered by said first skin structure, wherein said first peripheral edge portion extends beyond at least one of said plurality of depending projections, and wherein said second skin structure further comprises an edge opposite to said second peripheral edge portion, and stepped back from said at least one of said plurality of depending projections.

15. The load-bearing structure of claim 14, wherein said body portion further comprises cellular structure; wherein said first peripheral edge portion comprises a reinforcing fiber/matrix resin composite; and wherein each of said plurality of depending projections is hollow, has cell-forming walls having a generally U-shaped cross-section, and comprises a reinforcing fiber/matrix resin composite disposed in a generally U-shaped configuration within its respective walls.

* * * * *